United States Patent

Hughes et al.

[11] 3,821,311
[45] June 28, 1974

[54] PRODUCTION OF ALDEHYDES FROM OLEFINS

[75] Inventors: Oscar R. Hughes, Chatham Township, Morris County; Melville E. D. Hillman, Gillette, both of N.J.

[73] Assignee: Celanese Corporation, New York, N.Y.

[22] Filed: May 21, 1970

[21] Appl. No.: 39,186

[52] U.S. Cl....... 260/604 HF, 260/638 HF, 260/599
[51] Int. Cl............................................. C07c 45/08
[58] Field of Search............................ 260/604 HF

[56] References Cited
UNITED STATES PATENTS
3,278,612   10/1966   Greene ........................ 260/604 HF
3,511,880   5/1970    Booth .......................... 260/604 HF
3,527,809   9/1970    Pruett et al. ................. 260/604 HF

*Primary Examiner*—Leon Zitver
*Assistant Examiner*—R. H. Liles
*Attorney, Agent, or Firm*—Thomas J. Morgan; Marvin Turken; Ralph M. Pritchett

[57] ABSTRACT

Terminal olefins having the formula:

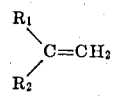

are transformed by a single-stage process into the product comprising saturated aldehydes having the formula:

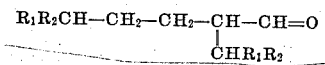

and the corresponding alpha, beta-unsaturated aldehydes wherein $R_1$ and $R_2$ each independently represents a hydrogen substituent or a hydrocarbon substituent of between 1 and about 12 carbon atoms. The transformation is achieved by contacting the olefin conjointly with hydrogen, carbon monoxide, and a solution in a special hydroxylic organic solvent of a rhodium carbonyl complex, a triaryl phosphine, triaryl arsine, or triaryl stibine, and an aldol condensation catalyst.

5 Claims, 1 Drawing Figure

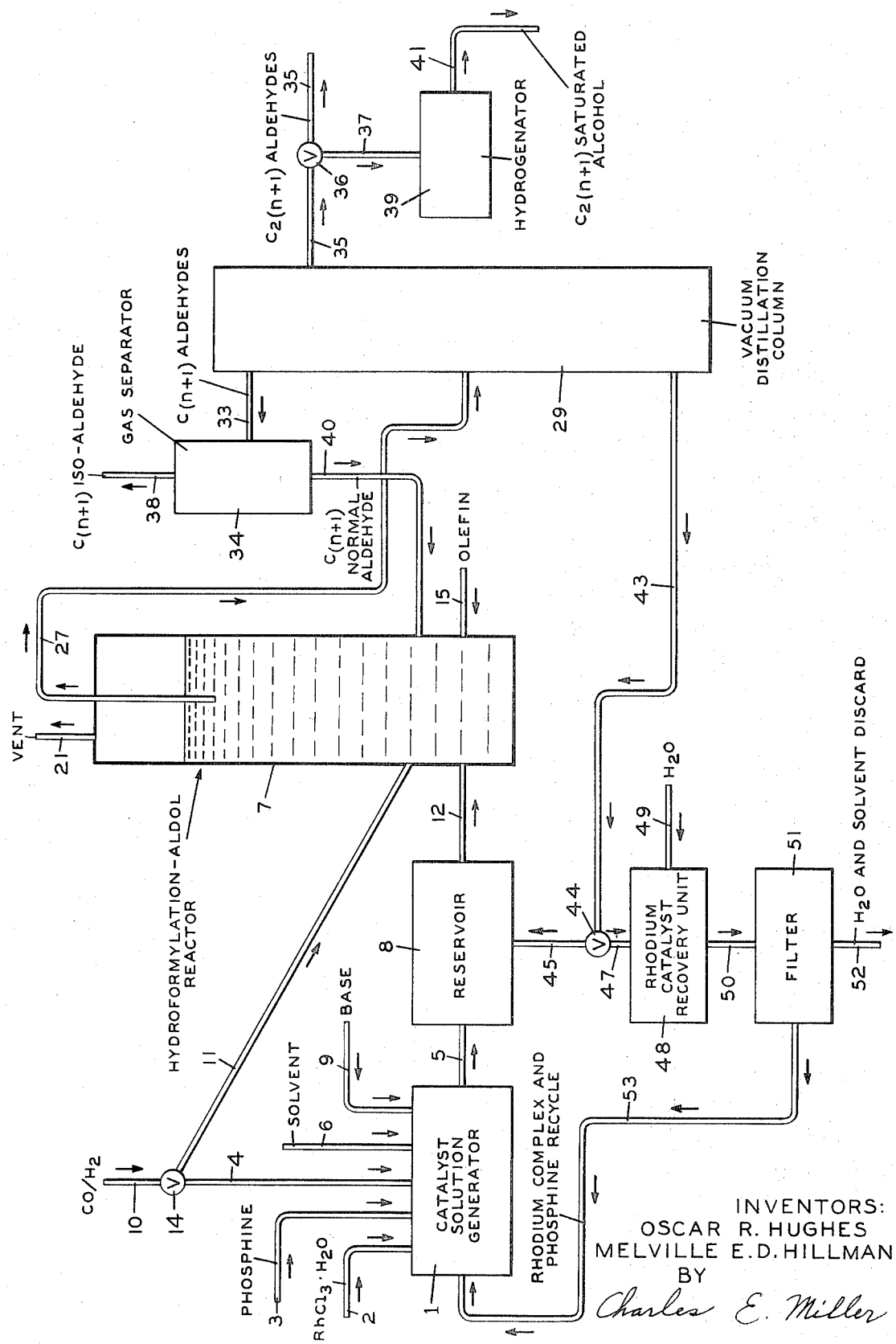

PRODUCTION OF ALDEHYDES FROM OLEFINS

BACKGROUND OF THE INVENTION

This invention relates to the production of aldehydes. More particularly, it relates to the production of $C_{2(n+1)}$ saturated and unsaturated aldehydes from Cn terminal olefins.

Methods for producing aldehydes from olefins are wellknown. In particular, the so-called "oxo process" has long been used for the conversion of Cn olefins into $C_{(n+1)}$ aldehydes by the coaction of hydrogen and carbon monoxide. More recently, a variant of this technique has been suggested whereby Cn terminal olefins, e.g., propylene, can be converted into $C_{2(n+1)}$ saturated alcohols, e.g., 2-ethylhexanol, in a single-stage operation. Thus, U.S. Letters Pat. No. 3,278,612 discloses a process whereby a Cn terminal olefin is "hydroformylated" by the oxo process (using a cobalt complex catalyst) to form a $C_{(n+1)}$ saturated aldehyde. This aldehyde then undergoes in situ aldol condensation, dehydration and hydrogenation to yield the $C_{2(n+1)}$ saturated aldehyde, which in turn is hydrogenated to form the saturated alcohol.

These transformations are summarized in the following equations (I-V):

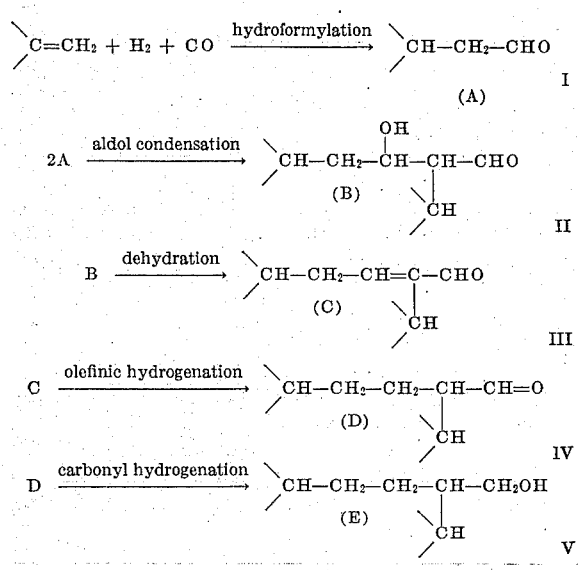

Unfortunately, methods heretofore known for effecting the above transformations (I-V) suffer from a number of disadvantages. An important disadvantage, and the one toward which the present invention is primarily directed, is the fact that when transformations I-V are attempted within a single reaction stage or sphere, competing side reactions occur to a significant extent, probably because of the severe reaction conditions (viz., high temperatures and pressures) required by heretofore known methods. Thus, for example, the terminal olefin undergoes substantial hydrogenation to the corresponding saturated hydrocarbon, and the intermediate aldehyde (A) is likewise capable of undergoing substantial reduction to the corresponding alcohol. Also, the efficiency of conversion of the olefin to the desired intermediate aldehyde (A) is diminished by the unwanted formation of the "branched chain" isomer of (A), which formation results from the attachment of the aldehydic carbonyl substituent to the penultimate carbon atoms of the olefin instead of the terminal methylene carbon atoms. Furthermore, the intermediate aldehyde (A) is substantially prevented from undergoing further desirable reaction due to acetalization with the aforementioned corresponding alcohol. These unwanted side reactions are known to contribute significantly to a decrease in the yields of the desired species (A), (B), (C), (D), and (E).

OBJECTS OF THE INVENTION

Therefore, it is an object of the present invention to provide a process for converting Cn terminal olefins into $C_{2(n+1)}$ aldehydes.

Another object is to provide an improved process for converting Cn terminal olefins into $C_{2(n+1)}$ aldehydes in a single stage with minimal interference from undesirable side reactions.

Another object is to provide a process for converting Cn olefins into $C_{2(n+1)}$ saturated alcohols.

Yet another object is to provide an improved process for converting Cn terminal olefins into $C_{2(n+1)}$ saturated alcohols with minimal interference from undesirable side reactions.

These and other objects of the present invention as well as the advantages thereof can be had by reference to the following detailed description.

SUMMARY OF THE INVENTION

Broadly, the above objects are achieved according to the present invention by contacting a Cn terminal olefin having the formula:

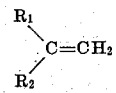

(wherein $R_1$ and $R_2$ each independently represents a hydrogen substituent or a hydrocarbon substituent of between 1 and about 12 carbon atoms) conjointly with hydrogen, carbon monoxide, and a liquid solution phase comprising:

a. a hydroxylic organic solvent;

b. a rhodium complex wherein the ligands are selected from the group consisting of carbon monoxide, phosphines, (or the corresponding arsines or stibines) hydrogen, and electronegative nucleophiles;

c. a triaryl phosphine, triaryl arsine, or triaryl stibine; and d. an aldol condensation catalyst. The desired product of the ensuing reactions is generally a mixture comprising saturated $C_{2(n+1)}$ aldehyde having the formula:

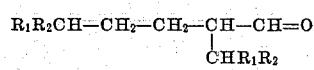

and the corresponding alpha, beta-unsaturated $C_{2(n+1)}$ aldehyde. It is also possible according to the present invention to adjust the reaction conditions in the manner hereinafter indicated in order to increase the yield of saturated $C_{2(n+1)}$ aldehyde at the expense of the alpha, beta-unsaturated form, and vice versa.

Without wishing to be bound by theory, it is believed that the overall transformation of Cn terminal olefin into saturated $C_{2(n+1)}$ aldehyde proceeds via the following sequence of reactions: hydroformylation, aldol condensation, dehydration, and olefinic hydrogenation. These individual transformations are depicted in equations I–IV, supra.

If desired, the $C_{2(n+1)}$ aldehydes produced according to the process of the present invention can be reduced further in a separate stage to form the corresponding saturated alcohol. For this purpose, any of a number of conventional procedures for reducing carbonyl substituents to alcoholic (i.e., hydroxyl) substituents can be used.

As indicated above, olefins suitable for use in the present process are terminal olefins which are conveniently represented by the following formula:

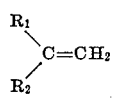

wherein $R_1$ and $R_2$ each independently represents a hydrogen substituent or a hydrocarbon substituent (including non-aromatic and aromatic hydrocarbon substituents) of between 1 and about 12 carbon atoms. Desirably, these terminal olefins are monoolefins, in which case the non-aromatic hydrocarbon substituents represented by $R_1$ and $R_2$ are saturated, i.e., are alkyl substituents. Preferably, $R_1$ is a hydrogen substituent and $R_2$ is a straight-chain alkyl substituent of between 1 and about 6 carbon atoms. Examples of terminal olefins suitable for use in the present invention are ethylene ($R_1 = R_2 = H$), propylene ($R_1 = H; R_2 = CH_3$), butylene ($R_1 = H; R_2 = C_2H_5$), isobutylene ($R_1 = R_2 = CH_3$), dodecene-1 ($R_1 = H; R_2 = C_{10}H_{21}$), and the like.

The initial reaction step of the single-stage process of the present invention involves the hydroformylation of the olefin by the coaction of hydrogen and carbon monoxide. The relative amounts of hydrogen and carbon monoxide used are desirably those employed in conventional hydroformylation processes, i.e., a molar ratio of between about 10:1 and about 10:10. Preferably, the molar ratio of hydrogen to carbon monoxide is between about 2:1 and about 1:2 with a molar ratio of about 1:1 being especially preferred. The total amounts of hydrogen and carbon monoxide used should be sufficient to achieve complete conversion of the Cn olefin to the intermediate $C_{n+1}$ aldehyde and to achieve activation of the rhodium complex catalyst, with an excess over these amounts being desirable. Furthermore, there should be sufficient hydrogen to reduce the alpha, beta-unsaturated $C_{2(n+1)}$ aldehyde to the corresponding saturated aldehyde to the extent that such a transformation is desired. In the event that complete conversion to the saturated $C_{2(n+1)}$ aldehyde is desired, correspondingly large amounts of hydrogen can be utilized, preferably in stoichiometric excess. The hydrogen and carbon monoxide can be introduced into the reaction sphere from separate sources. However, when employing the two gases in the aforementioned preferred molar ratio, it is advantageous to introduce part or all of the hydrogen and carbon monoxide in the form of a conveniently available mixture known in the art as "synthesis gas," which generally consists of an approximately equimolar mixture of hydrogen and carbon monoxide.

In addition to the aforementioned requirements, for a given reaction vessel and process temperature (to be described hereinafter), the total amount of hydrogen and carbon monoxide should be sufficient to maintain a pressure within the reaction zone of between about 1 atmosphere and about 3,000 pounds per square inch guage (hereinafter abbreviated to "p.s.i.g."). Preferably, a reaction pressure of between about 200 p.s.i.g. and about 1,000 p.s.i.g. is used, with a pressure of between about 500 p.s.i.g. and about 900 p.s.i.g. being especially preferred. Furthermore, it is especially desirable to exclude oxygen and peroxides from the reaction zone, since such materials are believed to catalyse undesirable side reactions. Such exclusion can be accomplished by conventional means, e.g., by prior "sweeping" of the reaction vessel with syntehsis gas or with an inert gas such as nitrogen.

An advantage of the process of the present invention is the fact that relatively low pressures (discussed hereinabove) and mild temperatures can be employed as compared to hitherto known methods. The temperature at which the single-stage process of the present invention is conducted is between about ambient temperature and about 175° C. Preferably, the reaction temperature is maintained at between about 75° C. and about 125°C. The aforementioned temperatures are desirably (although not necessarily) maintained constant throughout the process by means which will be apparent to those skilled in the art of conducting reactions involving heterogeneous or dual-phase (i.e., gas/liquid) systems in pressurized containers (e.g., autoclaves).

An especially important feature of the present invention lies in the discovery that the use of certain polyoxgenated hydroxylic organic liquids as solvents in the present process possesses some unique advantages over conventional menstrua. More particularly, it is a desideratum of this invention that the single stage process whereby Cn terminal olefins are transformed into alpha, beta-unsaturated $C_{2(n+1)}$ aldehydes, saturated $C_{2(n+1)}$ aldehydes, or mixtures of alpha, beta-unsaturated and saturated $C_{2(n+1)}$ aldehydes be conducted in a hydroxylic organic solvent, that is to say, solvents selected from the group consisting of polyhydric alcohols (including diols) and etherified polyhydric alcohols (including monoethers of diols) having at least 1 unetherified hydroxyl substituent. Polyoxgenated hydroxylic organic solvents suitable for use in the present invention must be capable of functioning as satisfactory reaction media under the requisite process conditionss, i.e., they must be capable of dissolving the rhodium complex catalyst, the triaryl phosphine, triaryl arsine, or triaryl stibine, and the aldol condensation catalyst as well as the various reaction intermediates. Furthermore, the solvents in the present invention must be inert under the conditions of the process, i.e., they must not participate chemically in any of the various reactions transpiring within the reaction zone or otherwise undergo any independent chemical alterations deleterious to the overall process. Yet another criterion which the polyoxgenated hydroxylic organic solvent must satisfy in order to qualify for use in the process of the present invention has to do with the vapor pressure of the solvent. In particular, the vapor pressure of the solvent must be sufficiently less than those of the various $C_{2(n+1)}$ aldehydes so as to faciliate isolation the latter by distillation. In other words, the relative boiling points of the solvent system and the product or products at any given pressure must be such that distillation of the product species is not accompanied to any substantial or significant extent by undesirable codistillation or azeotropy of the solvent.

Polyhydric alcohols which are suitable for use in the present process (i.e., which comport with the aforementioned criteria) are desirably polyhydric aliphatic alcohols containing between 2 and about 4 hydroxyl substituents and in which the ratio of the number of carbon atoms to the number of hydroxyl substituents per molecule is between 1 and about 2. Examples of such polyhydric aliphatic alcohols include (but are not limited to) ethylene glycol, 1,2-propylene glycol, 1,3-propylene glycol, 1,3-butylene glycol, and the like. Etherified polyhydric alcohols suitable for use according to the present invention are desirably derived from aliphatic alcohols and aliphatic polyhdric alcohols, must have at least one unetherified hydroxyl substituent and desirably contain between 2 and about 4 hydroxyl substituents (including etherified and unetherified hydroxyl substituents) per molecule. It is also a desirable feature of these partially etherified aliphatic polyhydric alcohols that the ratio of the number of carbon atoms to the total number of etherified and unetherified hydroxy substituents per molecule is between 1 and about 2. Examples of such partially etherified polyhydric alcohols include (but are not limited to) ethylene glycol monomethyl ether (i.e., $HOCH_2-CH_2OCH_3$), diethylene glycol (i.e., $HOCH_2-CH_2-O-CH_2CH_2OH$), diethylene glycol monomethyl ether (i.e., $HOCH_2CH_2-O-CH_2CH_2-OCH_3$), dipropylene glycol (i.e., $HOCH_2-CH(CH_3)O-CH(CH_3)-CH_2OH$), and the like. It is also a feature of the present invention that, of the monohydric alcohols, n-propanol is also suitable for use in the instant process, although it is less preferred for such use than the aforementioned polyoxygenated hydroxylic solvents for reasons which are given hereinafter (cf. Examples II, infra) The choice of a particular suitable hydroxylic organic solvent (or mixture of such solvents) for use in the present process will depend to some extent on the nature of the various reactants. In any particular case, the solvent system of optimum performance can be determined by routine experimentation.

The importance to the present invention of using the aforementioned hydryoxylic organic solvent lies in the discovery that such use results in the formation of $C_{2(n+1)}$ aldehyde products (i.e., saturated and unsaturated $C_{2(n+1)}$ aldehydes) in which the "straight-chain selectivity" is superior to that obtainable using solvents heretofore employed in the hydroformylation or oxo process art (e.g., paraffinic hydrocarbons as described in Belgian Pat. No. 714,275). The term "straight-chain selectivity" as used herein is understood to mean the efficiency or degree to which the desired isomeric form of $C_{2(n+1)}$ aldehydes (i.e., species (C) and (C) in Equations III and IV, supra) are produced as a result of the preferential hydroformylation of Cn terminal olefin to yield normal or "straight-chain" $C_{(n+1)}$ aldehyde (i.e., species (A) in Equation I, supra). A decrease in "straight chain selectivity" is believed to stem from the fact that a significant amount of iso or "branched-chain" $C_{(n+1)}$ aldehyde (F) is being formed as indicated in Equation VI below:

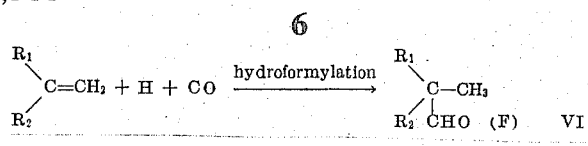

In cases where $R_1$ and $R_2$ are both hydrocarbon substituents, the "branched-chain" $C_{(n+1)}$ aldehyde (F) will be incapable of undergoing aldol condensation with itself. When $R_1$ is a hydrogen substituent and $R_2$ is a hydrocarbon substituent, the aldol condensation product derived solely from (F) will generally be incapable of undergoing base-catalysed dehydration to form the alpha, beta-unsaturated $C_{2(n+1)}$ aldehyde product. On the other hand, species (F) can undergo aldol condensation with straight-chain aldehyde (A) produced in Equation I, supra, but the $C_{2(n+1)}$ aldehyde product formed thereby will not be the desired isomer. It is a peculiar feature of the present invention that the use of the above-described hydroxylic solvents has the effect, for reasons which are not clear, of promoting the efficiency or degree to which the desired $C_{2(n+1)}$ aldehydes (C) and (D) are produced.

Rhodim complex catalyst suitable for use in the process of the present invention can be generally represented by the forumula:

$$[(XRR'R'')_m Rh (CO)_n Y_q]r$$

wherein:

m is 0, 1, 2, 3, or 4;  Subject to the condition that
n is 0, 1, 2, 3, or 4; m,n, and q are not simultaneously
q is 0, 1, or 3; equal to 0.
r is 1 or 2;

X represents a phosphorus, arsenic or antimony substituent, said substituent being trivalently bonded to R, R' and R'' and coordinately bonded to the central rhodium atom;

Y represents a hydrogen substituent, or any of a number of electronegative substituents or substituents which are anionic when in the free state (i.e., substituents which are formally capable of undergoing nucleophilic substitution reactions), e.g., halogen, hydroxyl, alkoxyl, and acylate (i.e., — OOCR''' wherein R''' is hydrogen or alkyl) substituents; and R, R' and R'' each independently represents a substituent selected from the group consisting of aryl substituents of between 6 and about 20 carbon atoms, alkyl substituents of between 1 and 12 carbon atoms, and the corresponding aryloxy, thioaryloxy, alkoxy, thioalkoxy, monoarylamino, monoalkylamino, diarylamino, dialkylamino, and aralkylamino substituents. It is within the scope of the present process that any two of the R, R' and R'' substituents can constitute a polyalkylene substituent, resulting thereby in phosphine, arsine, or stibine ligands having cyclic structures, e.g.,

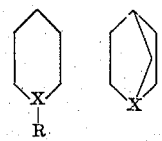

Referring to the above-described generic formula for the rhodium complex catalyst, it is pointed out that, although the arsine, phosphine, or stibine ligands (XRR'R'') are represented in said generic formula as being identical, it is not intended to preclude the possibility that they differ by virtue of independent variation in the nature of the X, R, R', and R'' substituents within a given molecule of rhodium complex. For example, when m is 2, 3, or 4, various combinations in the nature of X, R, R', and R'' can be employed within the limits of variation established for the substituents hereinabove. An unusual combination of the substituents which is suitable for use in the present process is embodied in the following formula for the rhodium complex, wherein $r=1$, X is a phosphorus substituent, R and R' constitute ethylene substituents bridging two phosphorus atoms, and R' and R'' are both phenyl substituents:

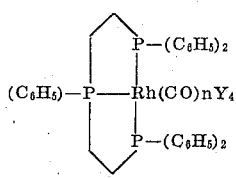

Other variations in the structure of the XRR'R'' ligand which are suitable for use in the present invention will suggest themselves to those skilled in the rhodium complex art. An important feature possessed by such X R R'R'' ligands when in the free state is low volatility relative to the volatilities of the $C_{2(n+1)}$ aldehyde products. This property of low volatility is desirable in view of the fact that such ligands are capable of being displaced from the rhodium complex by exchange reaction with the free triaryl phsophine, triaryl arsine, or triaryl stibine present in the reaction medium. Another desirable property exhibited by the XRR'R'' ligands is thermal stability, i.e., low susceptibility to decomposition at the aforementioned reaction temperatures and pressures.

Preferred rhodium complex catalysts suitable for use in the present process are those whose structures are within the scope of the foregoing generic formula wherein X is a phosphorus substituent R, R' and R'' are all phenyl substituents, and Y is a hydrogen, hydroxyl, halogen (especially chlorine), or acylate (especially acetate) substituent. Examples of such preferred rhodium complex catalysts include the following:

1. $Rh(CO)_4H$
2. $(PPh_3)_2Rh(CO)_2H$
3. $(PPh_3)Rh(CO)_3H$
4. $(PPh_3)_3Rh(CO)H$
5. $(PPh_3)_2Rh(CO)Cl$
6. $(PPh_3)_2Rh(CO)OH$
7. $(PPh_3)_2Rh(CO)$ $(OOCCH_3)$
8. $[Rh(CO)_2Cl]_2$
9. $[Rh(CO)_2(OOCCH_3)]_2$
10. $[(PPh_3)_3Rh(CO)]_2$
11. $[(PPh_3)_2Rh(CO)_2]_2$
12. $(PPh_3)_3Rh(OH)$
13. $RhCl_3 \cdot 3H_2O$
14. $(PPh_3)_4RhH$
15. $(PPh_3)_3RhCl_3$
16. $(PPh_3)_3RhCl$ Without wishing to be bound by theory, it is believed that the actual rhodium complex which effectuates the hydroformylation step of the present process may be any one of the species 1, 2, 3, and 4, supra. All of the other species 5-16 are believed to be converted to the aforementioned active species under the instant process conditions. Therefore, it is not necessary for the successful practice of the present invention that the rhodium catalyst be added as the preformed active complex species, and indeed, such is not generally possible in the case of species 1, 2, and 3, which are desirably prepared in situ. For example, $RhCl_3$ or, more preferably, its readily available hydrate, $RhCl_3 \cdot 3H_2O$, can be added to the reaction sphere together with an alkaline solution containing a phosphine ligand which is in excess of that required to form the desired complex. Under the herein prescribed conditions of temperature and pressure, the rhodium trichloride is converted to a catalytically active complex. When such an in situ method for preparing the rhodium complex catalyst is used, the overall rate of conversion of olefin may be somewhat slower than is the case when preformed catalyst is used. This dichotomy in reaction rates is presumably due to the additional time required to generate the active catalyst species. Procedures for converting commercially available rhodium salts, $RhY_3$, e.g., $RhCl_3$, $Rh(OA_c)_3$, etc., into the corresponding rhodium complexes 1-16, will be apparent to those skilled in the coordination complex art.

Previously known methods for converting Cn terminal olefins into $C_{2(n+1)}$ aldehydes and corresponding saturated alcohols within a single reaction vessel, e.g., with the aid of a cobalt complex catalyst, have required temperatures which are so high as to facilitate the undesirable hydrogenation of intermediate aldehydes, thereby resulting in substantial contamination of the desired end-product aldehyde or alcohol, and consequent decrease in yield of the latter. On the other hand, it is a feature of the present invention that the extraordinary activity of the rhodium catalyst system of the present invention permits the conversion of terminal monoolefins, e.g., propylene, to the various intermediates leading to the desired $C_{2(n+1)}$ aldehydes at lower temperatures and pressures and at lower catalyst concentrations whereby undesired side reactions of the type encountered heretofore are greatly suppressed. For example, at 120°C., the catalyst system having the formula $(PPh_3)_2Rh(CO)Cl$ is very selective in converting propylene to 2-ethylhaxanol precursors. No butyraldehyde is hydrogenated to butanol, and little or no propylene is hydrogenated to propane or converted to acetals.

The amount of rhodium complex catalyst used in the present process is such that it is effective when present in the solution phase at a concentration of between about 0.0001 molar and about 0.01 molar, with concentrations of between about 0.0005 molar and about 0.005 molar being preferred.

Triaryl phosphines, triaryl arsines, and triaryl stibines (or mixtures thereof) suitable for use as component (c) of the liquid solution phase of the present process are desirably those in which the aryl substituents contain between 6 and about 20 carbon atoms and include unsubstituted and substituted mononuclear, polynuclear, and "fused-ring" polynuclear aryl substituents, e.g., phenyl, tolyl, biphenyl, naphthyl, and the like substituents. More desirably, the three aryl substituents of the triaryl phosphine, arsine, or stibine are identical. Preferably, triaryl phosphines are employed, with triphenyl phosphine being especially preferred. The amount of phosphine, arsine, or stibine component used is such that the ratio of the concentration of such component to the concentration of the rhodium complex is between about 2:1 and about 300:1, and preferably between about 20:1 and about 200:1, with a ratio of about 100:1 being especially preferred.

The aldol condensation catalyst used in the process of the present invention can be any basic substance conventionally suitable for use in effecting such condensations. Preferably, the aldol condensation catalyst is an alkali metal hydroxide, e.g., sodium hydroxide, potassium hydroxide, cesium hydroxide, and the like. Alternatively, aldol condensation catalysts of the amine-acid type as described in Organic Reactions, Vol. 16, pp. 7-9 (John Wiley & Sons 1968) can be employed. Desirably, the aldol condensation catalyst is used in an amount corresponding to a concentration in the solution phase of between about 0.0001 molar and about 1.0 molar, and preferably between about 0.025 molar and about 0.2 molar, with a concentration of about 0.05 molar being especially preferred.

A further understanding of the process of the present invention can be had by reference to the accompanying drawing, which depicts a flow diagram of a convenient (but by no means exclusive) way of conducting the present process on a commercial scale. It will be appreciated by those skilled in the relevant art that the minipulations suggest by the drawing can be readily adapted to batch or continuous operation.

DESCRIPTION OF THE DRAWING

Referring now to the drawing, catalyst solution generator 1 is provided with inlet lines through which the various components of the catalyst solution (i.e., the liquid solution phase) are introduced into the generator. In particular, hydrated rhodium trichloride is supplied through feed line 2, triaryl phosphine through feed line 3, synthesis gas through feed line 4, hydroxylic organic solvent through feed line 6, and aldol condensation catalyst (base) through feed line 9. It is understood of course, that, in those cases where the raw materials fed to generator 1 are solids, the feed lines are to be regarded accordingly, i.e., as hatchways and the like conventional solids feeding means. The rates of flow of the various components through lines, 2, 3, 4, 6, and 9 are controlled by suitable conventional metering devices (not shown). The temperature within catalyst solution generator 1 is controlled by conventional means (not shown).

The liquid solution phase produced in generator 1 is transferred through line 5 to reservoir 8 where the solution phase is stored until ready for use. The transfer from generator 1 to reservoir 8 is facilitated by conventional pumping or metering means (not shown).

From reservoir 8, the liquid solution phase (comprising a hydroxylic solution of rhodium complex catalyst, triaryl phosphine, and aldol condensation catalyst) is transferred through line 12 by conventional pumping or metering means (not shown) to hydroformylation-aldol reactor 7. Reactor 7 is essentially an autoclave, preferably of stainless steel construction. Inlet lines 12, 11, 15, and 40 are designed to terminate at or near the bottom of reactor 7. Preferably, reactor 7 is provided with conventional heating means (not shown) and conventional agitation and/or sparging means (not shown) for the various feeds to ensure efficient mixing and contacting of the various reactants and components. Reactor 7 is provided with vent line 21 and product take-off line 27. The intake opening of line 27 is preferably situated near the top of the liquid reaction phase and the rate of intake into the take-off line can be governed by suitable conventional means (not shown) so as to maintain a constant level of liquid within reactor 7. Synthesis gas is introduced into reactor 7 through feed line 11 in an amount or at a rate which is conveniently determined by valve 14 which divides the flow of synthesis gas from source line 10 between line 4 and line 11. Olefin is introduced into reactor 7 through feed line 15.

The reaction mixture (which contains $C_{2(n+1)}$ aldehyde products) is withdrawn from reactor 7 through take-off line 27 and is transferred through the take-off line to vacuum distillation column 29 with the aid of conventional pumping or metering means (not shown). Vacuum distillation column 29 is of conventional design, and is provided with conventional heating and evacuating means (not shown) for subjecting the liquid reaction phase therein to conditions of elevated temperature and reduced pressure. The liquid reaction mixture is introduced within distillation column 29 at a point approximately midway between the top and bottom of the column. The $C_{2(n+1)}$ aldehydic distillate is withdrawn from the column at an appropriate point near the top thereof through take-off line 35.

The $C_{2(n+1)}$ aldehydic distillate can be transported to a suitable storage vessel (not shown) through line 35. Alternatively or simultaneously, the $C_{2(n+1)}$ aldehydic distillate can be transferred to conventional hydrogenator 39 through line 37. The apportionment of distillate between line 35 and 37 is conveniently accomplished by the use of conventional valve means 36. The $C_{2(n+1)}$ aldehydes within hydrogenator 39 are converted to corresponding $C_{2(n+1)}$ saturated alcohols under conventional hydrogenation conditions. The $C_{2(n+1)}$ saturated alcohol is then withdrawn from hydrogenater 39 through take-off line 41 and transferred with the aid of conventional pumping or metering means (not shown) to a suitable storage vessel (not shown).

The $C_{(n+1)}$ aldehydic intermediates, which are distilled from the liquid reactor mixture within distillation column 29, are withdrawn from the column at a point substantially higher within the column than the point at which the $C_{2(n+1)}$ aldehydic products are withdrawn. The $C_{(n+1)}$ aldehydic intermediates, which comprise mainly $C_{(n+1)}$ normal aldehydes and minor amounts of $C_{(n+1)}$ iso-aldehyde, are transferred through take-off line 33 to conventional gas separator 34, wherein the two aforementioned components are separated. The $C_{(n+1)}$ iso-aldehyde is withdrawn from gas separator 34 through take-off line 38 for suitable diposal. The $C_{(n+1)}$ normal aldehyde is withdrawn from gas separater 34 through take-off line 40 and recycled to hydroformylation-aldol reactor 7 for further reaction.

The residue within the distillation column 29 is withdrawn at a point near the bottom of the column through take-off line 43. This residual material, which comprises hydroxylic organic solvent, rhodium complex catalyst, triaryl phosphine, and aldol condensation catalyst, can be transferred to catalyst solution reservoir 8 through line 45. Alternatively or simultaneously, the residual liquid from distillation column 29 can be transferred to rhodium catalyst recovery unit 48 through line 47. The apportionment of distillation residue between lines 45 and 47 is conveniently accomplished by means of conventional valve means 44.

Rhodium catalyst recovery unit 48 is basically a precipitation apparatus into which water is introduced through feed line 49. The addition of substantial quantities of water in this manner results in the precipitation of rhodium complex catalyst and phosphine. The resulting slurry is transferred from catalyst recovery unit 48 through line 50 to conventional filtering means 51. The insoluble rhodium complex and phosphine can then be transferred from filter 51 to catalyst solution generator 1 through recycle line 53. The filtrate is withdrawn from filter 51 through take-off line 52 for suitable disposal.

EXAMPLES

The following examples are presented for the purpose of illustrating (but not limiting) the process of the present invention, as well as the advantages thereof.

In each of the examples, the catalyst mixture or solution is charged to and sealed in a Hastelloy C autoclave of 300 milliters capacity. The air in the autoclave is flushed out with nitrogen while the contents of the autoclave are stirred with a turbine sparger at 1,500 revolutions per minute.

Liquid olefin is admitted to the autoclave at ambient temperature. Then, 200 p.s.i.g. of synthesis gas ($H_2/CO = 1.2$) is admitted to the autoclave and the temperature therein is raised from ambient to reaction temperature.

As the propylene and synthesis gas are absorbed within the autoclave (due to the reaction of propylene with the synthesis gas), additional synthesis gas is admitted from a storage vessel (maintained at relatively high pressure) to maintain the autoclave at the desired reaction pressure. The rate of synthesis gas absorption by the reaction mixture within the autoclave is monitored by noting the decreased in the storage vessel pressure, the storage vessel being maintained at ambient temperature throughout the operation.

From time to time during the course of the reaction, samples of gas and liquid are withdrawn from the autoclave through appropriately placed lines. Gaseous samples (propane, propylene, CO, $H_2$) are analyzed by mass spectrometry and liquid samples are analyzed by vapor phase chromatography (vpc).

The number of moles of each species in the autoclave can be determined from knowledge of the corresponding vpc signal intensity and the signal intensity of an "internal standard" (4.0 grams of benzene). Signal intensities are corrected by predetermined sensitivity factors.

EXAMPLE I

This example illustrates the conversion of a Cn olefin (propylene) to $C_{2(n+1)}$ aldehydes (2-ethylehexenal and 2-ethylhexanal) according to the process of the present invention.

The autoclave is charged with 15 grams (0.36 mole) of propylene (vapor pressure ca. 136 p.s.i.g. at ambient temperature), synthesis gas, and a catalyst solution comprising 0.1 grams of $(PPh_3)_2 - Rh(CO)Cl$, 3.9 grams of $PPh_3$, 0.95 gram of KOH and 175 milliliters of diethylene glycol. A quantity (4.0 grams) of benzene is also charged to the autoclave to serve as an internal v.p.c. standard. The autoclave is sealed and the contents thereof heated to a reaction temperature of 120°C. and pressure of about 700 p.s.i.g. These conditions of temperature and pressure are maintained substantially constant throughout the reaction period.

Samples of the liquid solution phase are withdrawn from the autoclave after 35 minutes and 98 minutes. The efficiences of conversion of olefin to various intermediate and product species are summarized below in Table 1.

TABLE 1

| Efficiency of Propylene Conversion to Itemized Products[a] | Reaction Time | |
|---|---|---|
| | 35 min. | 98 min. |
| Extent of propylene conversion[b] | 42.0% | 84.2% |
| n-butyraldehyde | 4.2 | 10.8 |
| n-butanol | 0.0 | 0.0 |
| isobutanol | 0.0 | 0.0 |
| isobutyraldehyde | 1.1 | 5.6 |
| 2-ethylhexenal | 20.7 | 9.1 |
| 2-ethylhexanal | 11.6 | 51.4 |
| 2-ethylhexanol | 1.4 | 1.5 |
| 2-ethyl-4-methylpentenal[c] | 2.6 | 3.2 |
| 2-ethyl-4-methylpentanal[c] | 0.4 | 2.6 |
| Sum of efficiencies to 2-ethylhexyl derivitives | 33.7 | 62.0 |
| Overall straight-chain selectivity | 93.5 | 89.9 |

[a] % efficiency of propylene conversion = (moles of itemized products)/(moles of propylene charged) × (moles of propylene required to form 1 mole of product) × 100
[b] Analysis of the gas phase after 90 minutes indicated propylene and propane were present in a molar ratio of 40:1
[c] Derived from a molecule of n-butyraldehyde and a molecule of iso-butyraldehyde.

The date in TABLE 1 clearly demonstrate that propylene is efficiently converted to 2-ethylhexyl derivatives in diethylene glycol solvent. The high efficiency of conversion to the desired $C_{2(n+1)}$ aldehydes and corresponding alcohol (i.e., 2-ethylhexanol) is attributable to high conversion of propylene to $C_{(n+1)}$ aldehyde intermediates, the selectivity of this conversion to the straight-chain isomeric form of said aldehydes (i.e., n-butyraldehyde), and to the fact that this intermediate is not lost to any substantial extent due to undesirable hydrogenation to $C_{(n+1)}$ alcohol (i.e., n-butanol).

EXAMPLE II

This example further illustrates the conversion of a Cn olefin (propylene) to $C_{2(n+1)}$ aldehydes (2-ethylhexenal and 2-ethylhexanal) according to the present invention.

The autoclave is charged with 15 grams (0.36 mole) of propylene, synthesis gas, 4.0 grams of benzene and a catalyst solution comprising 0.1 gram of $(PPh_3)_2 Rh(CO)Cl$, 3.9 grams of $PPh_3$, 0.5 grams of KOH, and 175 milliliters of n-propanol. The autoclave is sealed and the contents thereof heated to a reaction temperature of 120°C. and pressure of about 500 p.s.i.g. These conditions of temperature and pressure are maintained substantially constant throughout the reaction period.

Samples of the liquid solution phase are withdrawn from the autoclave after 77 minutes and 105 minutes. The efficiences of conversion of olefin to various intermediate and product species are summarized below in TABLE 2.

TABLE 2

| Efficiency of Propylene Conversion to Itemized Products | Reaction Time | |
|---|---|---|
| | 77 min. | 105 min. |
| Extent of propylene conversion | 35% | 40% |
| n-butyraldehyde | 25.0 | 27.0 |
| n-butanol | 0.0 | 0.0 |
| isobutyraldehyde | 2.8 | 3.1 |
| isobutanol | 0.0 | 0.0 |
| 2-ethylhexenal | 2.5 | 2.3 |
| 2-ethylhexanal | 4.0 | 7.1 |
| 2-ethylhexanol | 0.0 | 0.0 |
| 2-ethyl-4-methylpentenal | 0.0 | 0.0 |
| 2-ethyl-4-methylpentanal | 0.5 | 0.5 |

TABLE 2-Continued

| Efficiency of Propylene Conversion to Itemized Products | Reaction Time | |
|---|---|---|
| | 77 min. | 105 min. |
| Sum of efficiences to 2-ethylhexyl derivatives | 6.5 | 9.4 |
| Overall straight-chain selectivity | 92.1 | 92.3 |

The results in TABLE 2, taken in conjunction with those in TABLE 1 indicate that, although n-propanol can be used in lieu of a polyoxgenated hydroxylic solvent to achieve high selectivity to straight chain-products, such a substitution in solvents results in a somewhat reduced efficiency of conversion to $C_{2(n+1)}$ products as compared with the efficiency of conversion using the preferred polyoxgenated hydroxylic solvents.

EXAMPLE III

This example demonstrates that the $C_{2(n+1)}$ aldehyde products can be distilled from the liquid solution phase and that the latter can be re-used.

The autoclave is charged with 14.6 grams (0.35 mole) of propylene, synthesis gas, 4.0 grams of benzene, and a catalyst solution comprising 0.1 gram of $(PPh_3)_2 Rh(CO)Cl$, 3.9 grams of $PPh_3$, and 3.0 grams of CsOH in 175 milliliters of diethylene glycol. The reaction is carried out at 120°C. at a pressure which is maintained at 500 p.s.i.g. by appropriate adjustment of the synthesis gas pressure.

Samples of liquid are withdrawn from the autoclave after 31, 74, and 120 minutes. The efficiencies of conversion of propylene to various products are summarized in TABLE 3.

TABLE 3

| Efficiency of Propylene Conversion to Itemized Products | Reaction Time | | |
|---|---|---|---|
| | 31 min. | 74 min. | 120 min. |
| Extent of Propylene Conversion | 69% | 87% | 91% |
| n-butyraldehyde | 19.1 | 16.0 | 11.3 |
| n-butanol | 0 | 0 | 0 |
| isobutyraldehyde | 9.3 | 13.5 | 14.1 |
| isobutanol | 0 | 0 | 0 |
| 2-ethylhexenal | 20.0 | 18.5 | 9.1 |
| 2-ethylhexanal | 15.9 | 31.4 | 50.0 |
| 2-ethylhexanol | 1.3 | 2.0 | 2.0 |
| Sum of Efficiencies to 2-ethylhexyl derivatives | 37.2 | 51.9 | 61.1 |

The liquid phase remaining in the autoclave after the reaction is transferred to a vacuum distillation assembly. The butyraldehydes, $C_8$ compounds, and benzene are removed from the solution by distillation under reduced pressure at a temperature of below 50°C.

The residue, which contains the rhodium complex, the phosphine, and the aldol condensation catalyst, is charged to the autoclave. Benzene (4.0 grams) and propylene (13.3 grams) are admitted, and the system resubjected to the aforementioned reaction conditions. Table 4 lists the mole percent efficiencies of propylene conversion to itemized products in this second use of the catalyst solution.

The $C_4$ and $C_8$ products of this second use of the catalyst solution are likewise distilled off so that the catalyst solution could be used a third time. Table 5 lists the mole percent efficiencies of propylene (15.3 grams) conversion to itemized products in this third use of the catalyst solution.

TABLE 4

| Efficiency of Propylene Conversion to Itemized Products | Reaction Time | |
|---|---|---|
| | 28 min. | 120 min. |
| Extent of Propylene Conversion | 69% | 100% |
| isobutyraldehyde | 16 | 24 |
| n-butyraldehyde | 16 | 6 |
| 2-ethylhexenal | 23 | 13 |
| 2-ethylhexanal | 11 | 52 |
| 2-ethylhexanol | 0 | 0.3 |

TABLE 5

| Efficiency of Propylene Conversion to Itemized Products | Reaction Time | |
|---|---|---|
| | 25 min. | 100 min. |
| Extent of Propylene Conversion | 50% | 91% |
| isobutyraldehyde | 10 | 20 |
| n-butyraldehyde | 15 | 17 |
| 2-ethylhexenal | 13 | 13 |
| 2-ethylhexanal | 6 | 34 |
| 2-ethylhexanol | 1.3 | 1.5 |

EXAMPLE IV

This example illustrates that when propylene is hydroformylated using a cobalt complex catalyst and trialkyl phosphine or triaryl phosphine in lieu of a rhodium complex and triaryl phosphine, more severe conditions of temperature and pressure are required, with the result that the efficiency of conversion to 2-ethylhexyl derivatives is decreased. This loss in efficiency is principally due to a loss in selectivity because intermediate n-butyraldehyde is hydrogenated to by-product n-butanol by the Co catalyst.

An amount (15.4 grams) of propylene was admitted to a catalyst mixtured compound of 4.06 gram of $CO_2(CO)_8$, 4.81 gram of $P(n-butyl)_3$ and 2.5 gram of KOH in 175 milliliters of n-propanol. The reaction temperature was controlled at 170°C and the reaction pressure was maintained at 1,400 p.s.i.g. with 1/1 $H_2/CO$ gas mixture. After 160 minutes, the pressure drop in the storage vessel was 355 p.s.i.g. The results are summarized below in TABLE 6.

TABLE 6

| Efficiency of Propylene Conversion to Itemized Products | Reaction Time | |
|---|---|---|
| | 26 min. | 160 min. |
| Extent of propylene conversion | 60% | 94% |
| n-butyraldehyde | 4.5 | 0.0 |
| n-butanol | 30.3 | 53.6 |
| isobutyraldehyde | 1.3 | 0.0 |
| isobutanol | 6.4 | 9.3 |
| 2-ethylhexanol | 13.7 | 4.7 |
| 2-ethylhexanal | 4.2 | 21.6 |

TABLE 6-Continued

| Efficiency of Propylene Conversion to Itemized Products | Reaction Time | |
|---|---|---|
| | 26 min. | 160 min. |
| 2-ethylhexanol | 0.0 | 0.0 |
| Sum of efficiencies to 2-ethylhexyl derivatives | 17.9 | 26.3 |
| Overall straight-chain selectivity | 87 | 90 |

The reaction does not proceed at 120°C with $Co_2(CO)_8$ and $P(n\text{-butyl})_3$ or $PPh_3$, either in n-propanol or in diethylene glycol. At 160° after 100 minutes, there is only 28 percent conversion of propylene with a sum of efficiencies to 2-ethylhexyl derivatives of only one percent when $Co_2(CO)_8$ and $PPh_3$ are used in diethylene glycol.

I claim:

1. A process for transforming a terminal olefin having the formula:

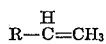

into a product comprising a saturated aldehyde having the formula:

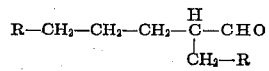

and the corresponding alpha, beta-unsaturated aldehyde wherein R is a straight-chain alkyl substituent of between one and about six carbon atoms, which process comprises contacting the olefin cojointly with hydrogen, carbon monoxide, and a liquid solution phase comprising:
  a. a hydroxylic organic solvent selected from the group consisting of ethylene glycol, 1,2-propylene glycol, 1,3-propylene glycol, 1,3-butylene glycol, ethylene glycol monomethyl ether, diethylene glycol, diethylene glycol monomethyl ether, and dipropylene glycol;
  b. a rhodium complex represented by the formula: $(PPh_3)_2 RH(CO)Cl$ or $(PPh_3)_3 RH(CO)H$;
  c. a triphenyl phosphine; and
  d. an aldol condensation catalyst, said process being conducted at a temperature between about 75°C and about 125°C and at a pressure of between about 200 p.s.i.g. and about 1,000 p.s.i.g. and with a molar ratio of hydrogen to carbon monoxide between about 2:1 and about 1:2.

2. A process according to claim 1 wherein the aldol condensation catalyst is an alkali metal hydroxide and the process is conducted at a pressure between about 500 p.s.i.g. and about 900 p.s.i.g..

3. A process according to claim 2 wherein:
the terminal olefin is propylene;
the molar ratio of hydrogen to carbon monoxide is about 1:1;
the polyoxgenated hydroxylic organic solvent is diethylene glycol,
the concentration of rhodium complex within the liquid solution phase is between about 0.0001 molar and about 0.01 molar;
the triphenyl phosphine component (c) of the liquid solution phase is employed in an amount such that the ratio of the concentration within the liquid solution phase of such component to the concentration of the rhodium complex is between about 2:1 and about 300:1; and
the concentration of condensation catalyst is between about 0.0001 molar and about 1.0 molar.

4. A process according to claim 3 wherein:
the hydrogen and carbon monoxide are employed in the form of synthesis gas;
the concentration of rhodium complex is between about 0.0005 molar and about 0.005 molar;
the ratio of the concentration of triphenyl phosphine to the concentration of rhodium complex is between about 20:1 and about 200:1; and
the concentration of aldol condensation catalyst is between about 0.025 molar and about 0.2 molar 5. A process according to claim 4 wherein:
the ratio of the concentration of triphenyl phosphine to the concentration of rhodium complex is about 100:1; and
the concentration of aldol condensation catalyst is about 0.05 molar.

* * * * *

UNITED STATES PATENT OFFICE
CERTIFICATE OF CORRECTION

Patent No. 3,821,311      Dated June 28, 1974

Inventor(s) Oscar R. Hughes and Melville E. D. Hillman

It is certified that error appears in the above-identified patent and that said Letters Patent are hereby corrected as shown below:

In column 14, line 51, for "compound" read -- composed --.

In column 14, line 52, for "$CO_2(CO)_8$"

read --    $Co_2(CO)_8$    --.

In claim 1, line 23, for "$R-\overset{H}{C}=CH_3$"

read --    $R-\overset{H}{C}=CH_2$    --.

Signed and sealed this 3rd day of December 1974.

(SEAL)
Attest:

McCOY M. GIBSON JR.      C. MARSHALL DANN
Attesting Officer      Commissioner of Patents